(12) United States Patent
Dyckerhoff et al.

(10) Patent No.: US 6,976,154 B1
(45) Date of Patent: Dec. 13, 2005

(54) PIPELINED PROCESSOR FOR EXAMINING PACKET HEADER INFORMATION

(75) Inventors: Stefan Dyckerhoff, Palo Alto, CA (US); Tesfaye Teshager, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 595 days.

(21) Appl. No.: 09/986,019

(22) Filed: Nov. 7, 2001

(51) Int. Cl.[7] .............................................. G06F 13/10
(52) U.S. Cl. ...................................... 712/220; 712/206
(58) Field of Search ............................ 712/25, 26, 220, 712/214, 206; 709/240; 370/389, 392

(56) References Cited

U.S. PATENT DOCUMENTS

| | | | |
|---|---|---|---|
| 5,448,745 A * | 9/1995 | Okamoto ...................... | 712/25 |
| 5,627,982 A * | 5/1997 | Hirata et al. ................. | 712/206 |
| 6,160,809 A * | 12/2000 | Adiletta et al. ............. | 370/392 |
| 6,477,562 B2 * | 11/2002 | Nemirovsky et al. ....... | 718/108 |
| 6,760,337 B1 * | 7/2004 | Snyder et al. ........... | 370/395.4 |

OTHER PUBLICATIONS

John L Hennessy and David A Patterson; Computer Organization and Design—The Hardware/Software Interface; 1998; Morgan Kaufman Publishing; 2nd Edition; pp. 436 and 452.*

The Authoritative Dictionary of IEEE Standards Terms; IEEE Press; 2000; 7th Edition; p. 508.*

Online Computing Dictionary; http://www.instantweb.com/d/dictionary/index.html; "encode"—Jul. 06, 1999; "encoder"—Mar. 4, 1999; "header"—1994-1999; "program counter"—Mar. 21, 1995.*

Online Computing Dictionary, http://www.instantweb.com/d/dictionary/foldoc.cgi?query=branch+prediction, Mar. 14, 1998, defintion of "branch prediction".*

John L Hennessy and David A Patterson, Computer Organization and Design The Hardware/Software Interface, 1998, Morgan Kaufmann Publishers Inc, 2nd Edition, pp. 576-578.*

John L Hennessy and David A Patterson, Computer Architecture A Quantitative Approach, 1996, Morgan Kaufmann Publishers Inc, 2nd Edition, pp. 278-284 and 335-349.*

* cited by examiner

*Primary Examiner*—Eric Coleman
(74) *Attorney, Agent, or Firm*—Harrity & Snyder LLP

(57) ABSTRACT

A packet processing engine includes multiple microcode instruction memories implemented in parallel. For each cycle of the pipeline, an instruction from each of the memories is retrieved based on a program counter. One of the instructions is selected by a priority encoder that operates on true/false signals generated based on the instructions. The selected instruction is executed to thereby perform the packet processing operations specified by the instruction.

29 Claims, 6 Drawing Sheets

PIPELINED PROCESSOR FOR EXAMINING PACKET HEADER INFORMATION

BACKGROUND OF THE INVENTION

1. Field of the Invention

The principles of the invention relate generally to pipelined information processing, and more particularly, to the pipelined processing of packet header information.

2. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were designed with components optimized for routing. They not only handle higher line rates and higher network traffic volume, they also add functionality without compromising line rate performance.

A purpose-built router may include a number of input and output ports from which it transmits and receives information packets. A packet received at one port is directed to its appropriate output port based on an examination and processing of the packet's header information, which includes an indication of the packet's destination. A high-performance router must accordingly examine and process the header information at a high speed.

SUMMARY OF THE INVENTION

Systems and methods consistent with the principles of the invention, among other things, include a pipelined hardware processing engine optimized for processing of packet header information.

Consistent with the principles of one aspect of the invention, a pipelined processor includes a first pipeline stage and a second pipeline stage. The first pipeline stage includes instruction memories and a program counter configured to store read instructions from the instruction memories. A second pipeline stage includes a priority encoder configured to select one of the instructions based on evaluation results generated from the instructions read from the instruction memories and an execution unit configured to receive the selected one of the instructions and to perform operations indicated by the selected instruction.

A second aspect consistent with the principles of the invention is directed to a network device. The network device includes a physical interface configured to receive packets from and transmit packets to a network. A processing unit is configured to store the received packets and to examine header information of the packets to determine destinations of the packets. The processing unit includes a pipelined packet processing engine that includes a first pipeline stage and a second pipeline stage. The first pipeline stage reads a plurality of packet processing instructions from an instruction memory. The second pipeline stage selects one of the instructions for execution.

A third aspect consistent with the principles of the invention is directed to a method for processing a packet to determine control information for the packet. The method includes reading instructions and generating a predicted address based on a predetermined one of the read instructions. Further, the method includes evaluating the read instructions and selecting one of the read instructions based on the evaluations. The method additionally includes performing operations related to determining the control information for the packet based on the selected instruction, the operations including generating a true next address for reading instructions.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim limitations.

As described herein, a pipelined packet processing engine is capable of analyzing and generating control information for packets at a high speed. Flexibility is achieved in packet processing by providing a micro-coded instruction set appropriate for packet processing. The processing engine may process multiple mutually exclusive microcode instructions in parallel.

System Configuration

Figure 1:
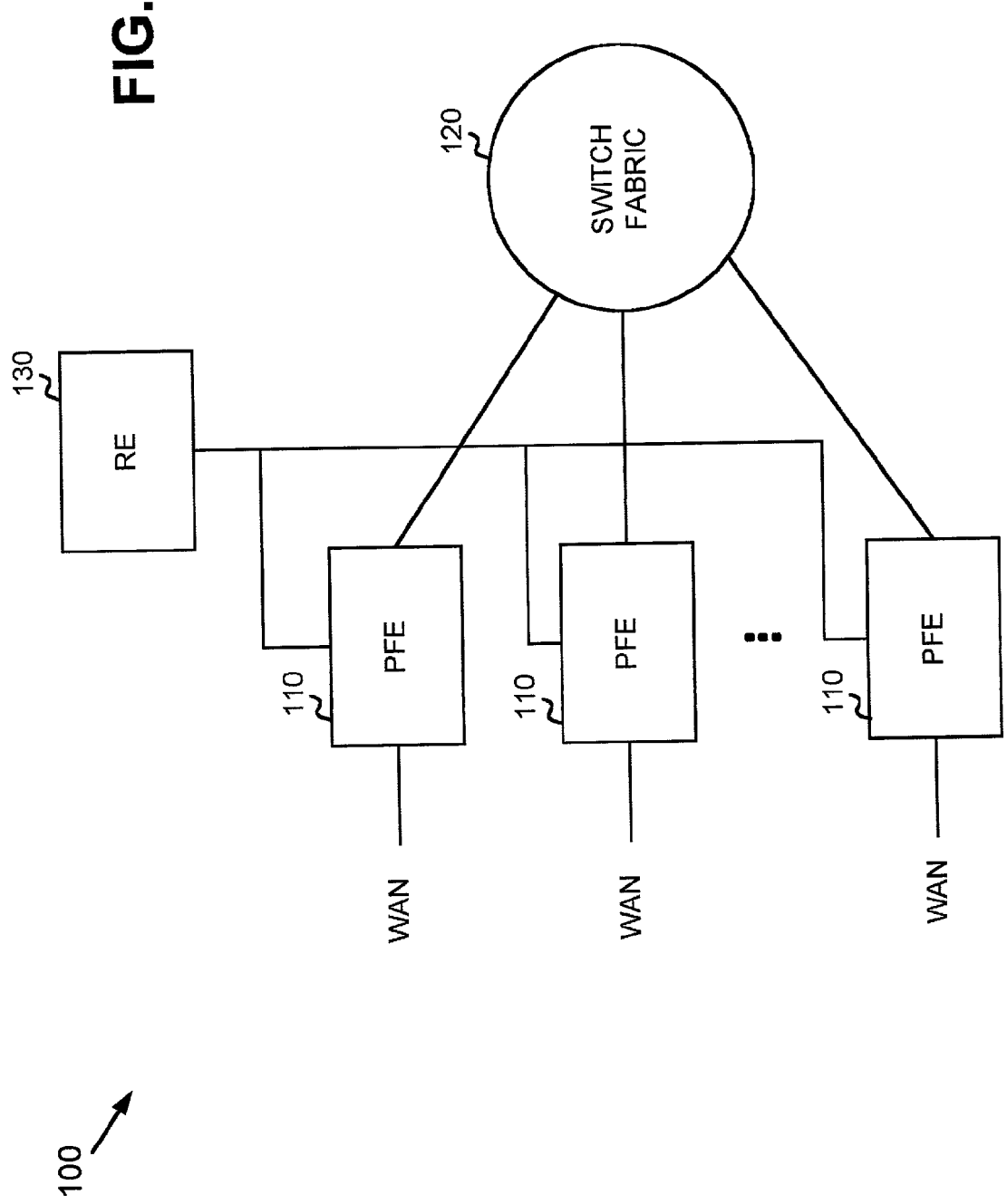
FIG. 1 is a block diagram illustrating an exemplary routing system in which principles consistent with the invention may be implemented.

FIG. 1 is a block diagram illustrating an exemplary routing system 100 in which the present invention may be implemented. System 100 receives data streams from a physical link, processes the data stream to determine destination information, and transmits the data stream out on a link in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 creates routing tables based on network topology information, creates forwarding tables based on the routing tables, and forwards the forwarding tables to PFEs 110. PFEs 110 use the forwarding tables to perform route lookup for incoming packets. RE 130 also performs other general control and monitoring functions for system 100.

PFEs 110 are each connected to RE 130 and switch fabric 120. PFEs 110 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard or Ethernet.

PFE 110 processes incoming data by stripping off the data link layer. PFE 110 converts header information from the remaining data into data structures referred to herein as D cells (where a cell is a fixed length data unit). For example, in one embodiment, the data remaining after the data link layer is stripped off is packet data. PFE 110 includes the layer 2 (L2) and layer 3 (L3) packet header information, some control information regarding the packets, and the packet data in a series of D cells. In one embodiment, the L2, L3, and the control information are stored in the first two cells of the series of cells.

PFE 110 forms a notification based on the L2, L3, and control information, and performs a route lookup using the notification and the routing table from RE 130 to determine destination information. PFE 110 may also further process the notification to perform protocol-specific functions, policing, and accounting, and might even modify the notification to form a new notification.

If the determined destination indicates that the packet should be sent out on a physical link connected to PFE 110, then PFE 110 retrieves the cells for the packet, converts the notification or new notification into header information, forms a packet using the packet data from the cells and the header information, and transmits the packet from the port associated with the physical link.

If the destination indicates that the packet should be sent to another PFE via switch fabric 120, then PFE 110 retrieves the cells for the packet, modifies the first two cells with the new notification and new control information, if necessary, and sends the cells to the other PFE via switch fabric 120. Before transmitting the cells over switch fabric 120, PFE 110 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, in one embodiment, RE 130, PFEs 110, and switch fabric 120 perform routing based on packet-level processing. PFEs 110 store each packet in cells while performing a route lookup using a notification, which is based on packet header information. A packet might be received on one PFE and go back out to the network on the same PFE, or be sent through switch fabric 120 to be sent out to the network on a different PFE.

Figure 2:
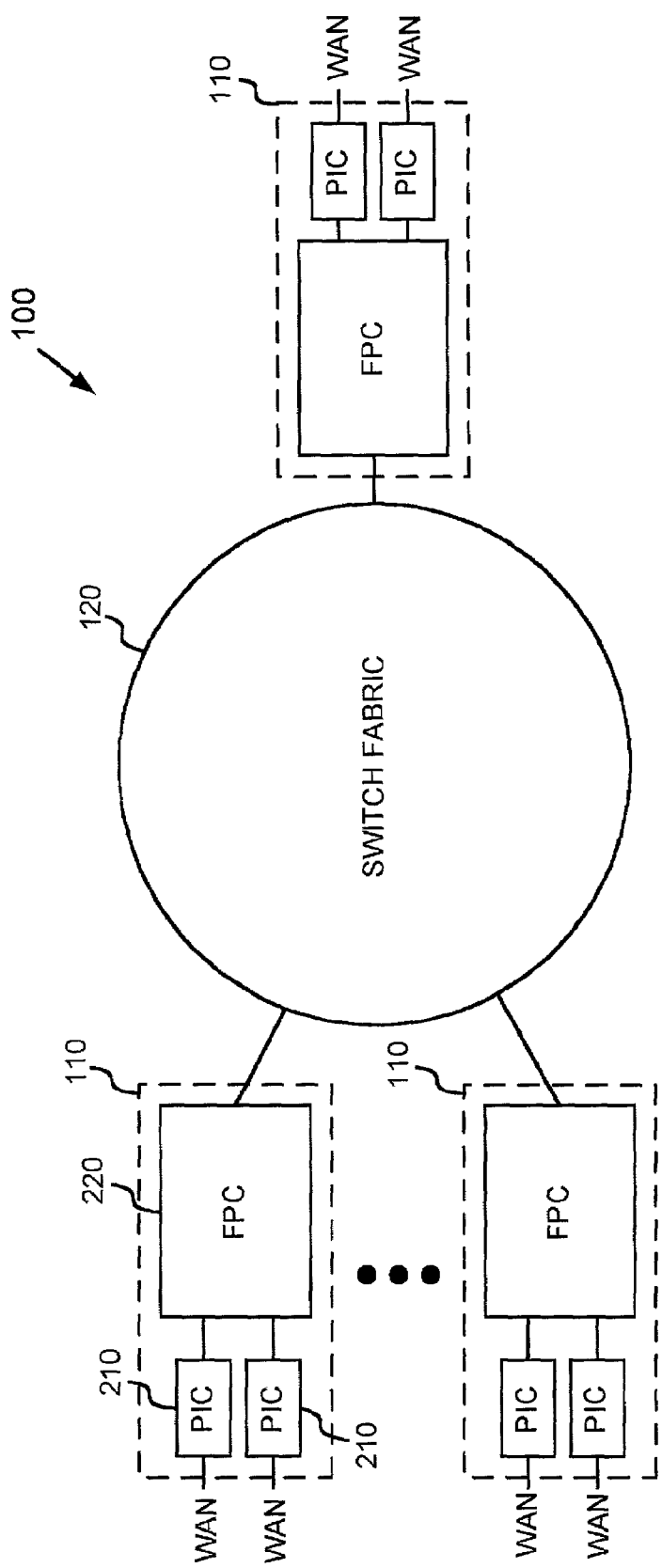
FIG. 2 is an exemplary detailed block diagram illustrating portions of the routing system shown in FIG. 1.

FIG. 2 is an exemplary detailed block diagram illustrating portions of routing system 100. PFEs 110 connect to one another through switch fabric 120. Each of the PFEs may include one or more physical interface cards (PICs) 210 and flexible port concentrators (FPCs) 220.

PIC 210 may transmit data between a WAN physical link and FPC 220. Different PICs are designed to handle different types of WAN physical links. For example, one of PICs 210 may be an interface for an optical link while the other PIC may be an interface for an Ethernet link.

For incoming data, in one embodiment, PICs 210 may strip off the layer 1 (L1) protocol information and forward the remaining data, such as raw packets, to FPC 220. For outgoing data, PICs 210 may receive packets from FPC 220, encapsulate the packets in L1 protocol information, and transmit the data on the physical WAN link. While two PICs 210 are shown in FIG. 2 as included in a PFE 110, there may be more or fewer PICs in other implementations consistent with the principles of the invention.

FPCs 220 perform routing functions and handle packet transfers to and from PICs 210 and switch fabric 120. For each packet it handles, FPC 220 performs the previously-discussed route lookup function. Although FIG. 2 shows two PICs 210 connected to each of FPCs 220 and three FPCs 220 connected to switch fabric 120, in other embodiments consistent with principles of the invention there can be more or fewer PICs 210 and FPCs 220.

Figure 3:
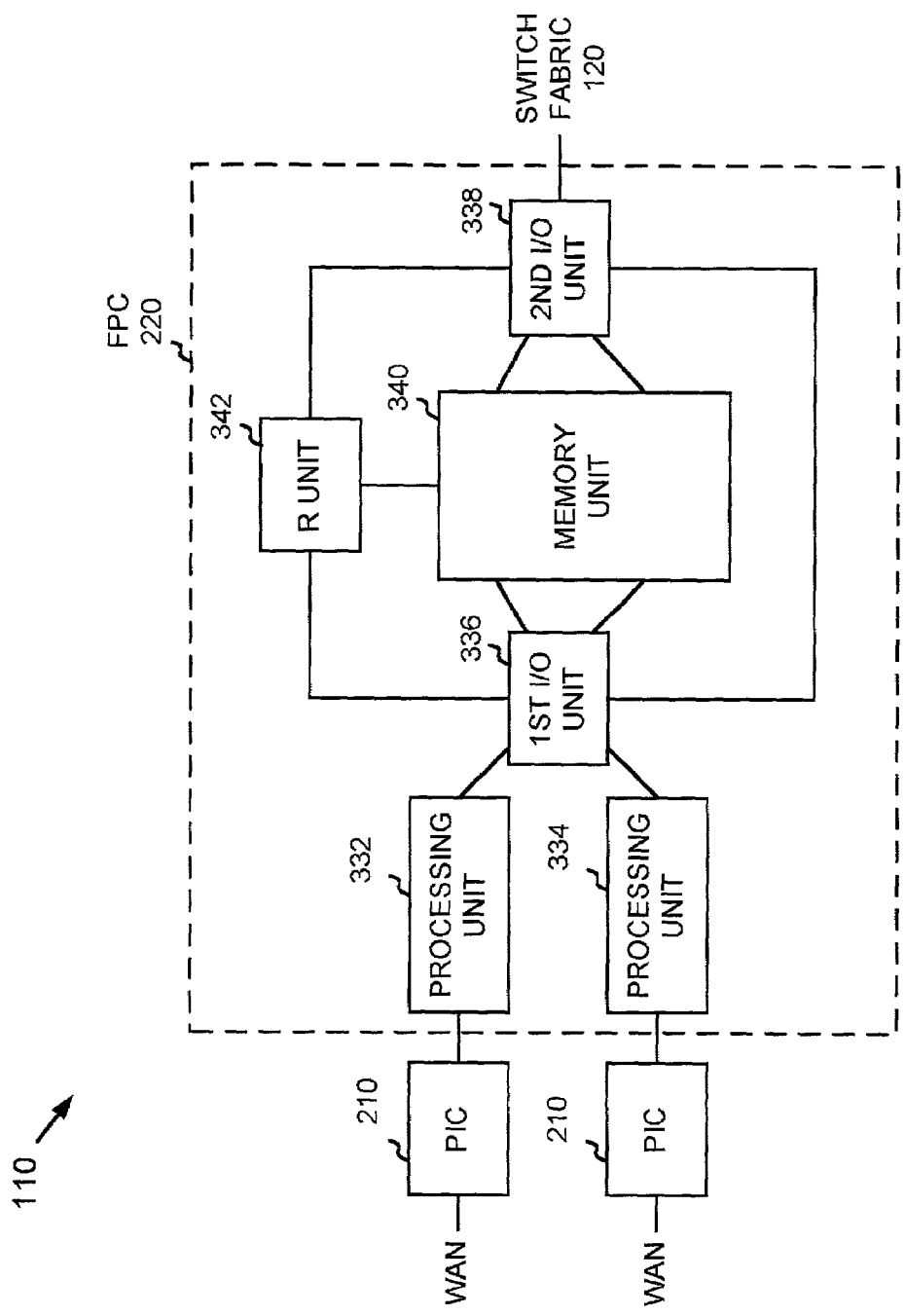
FIG. 3 is a diagram illustrating portions of FIG. 2 in additional detail.

FIG. 3 is an exemplary configuration of FPC 220 according to an implementation consistent with the principles of the invention. FPC 220 may include processing units 332 and 334, first input/output (I/O) unit 336, second I/O unit 338, memory unit 340, and R unit 342. Each processing unit 332 and 334 corresponds to one of PICs 210.

As will be described in greater detail below, processing units 332 and 334 may process packet data flowing between PICs 210 and first I/O unit 336. Each processing unit 332 and 334 may operate in two modes: a first mode for processing packet data received from the PIC connected to it, and a second mode for processing data received from first I/O unit 336.

In the first mode, processing unit 332 or 334 may process packets from PIC 210 to convert the packets into data cells, and transmit the data cells to first I/O unit 336. Data cells are the data structure used by FPC 220 internally for transporting and storing data. In one implementation, data cells are 64 bytes in length.

Packets received by processing unit 332 or 334 may include two portions: a header portion and a packet data portion. For each packet, processing unit 332 or 334 may process the header and insert the results of the processing into the data cells. For example, processing unit 332 or 334 might parse L2 and L3 headers of incoming packets and place the results in the data cells. The data stored in the data cells might also include some of the original header information, as well as processed header information. Processing unit 332 or 334 may also create control information based on the packet. The control information may be based on the packet header, the packet data, or both. Processing unit 332 or 334 may then store the processing results, control information, and the packet data in data cells, which it sends to first 110 unit 336.

In the second mode, processing unit 332 or 334 handles data flow in a direction opposite the first mode. In the second mode, processing unit 332 or 334 receives data cells from first I/O unit 336, extracts certain information and packet data from the data cells, and creates a packet based on the extracted information. Processing unit 332 or 334 creates the packet header from the information extracted from the data cells. In one embodiment, processing unit 332 or 334 creates L2 and L3 header information based on the extracted information. Processing unit 332 or 334 may load the packet data portion with the packet data from the data cells.

First I/O unit 336 and second I/O unit 338 coordinate data transfers into and out of FPC 220. Upon receiving data cells, first I/O unit 336 and second I/O unit 338 may extract certain information stored in the data cells, create a key based on the extracted information, and store the key in a notification. The key may contain information later used by R unit 342 to perform a route lookup for data cells received from processing unit 332 or processing unit 334, or encapsulation lookup, for data cells received from another PFE via switch fabric 120.

First I/O unit 336 and second 110 unit 338 may store the data cells in memory unit 340. First I/O unit 336 and second I/O unit 338 may store, in the notification, address information identifying the locations of the data cells in memory unit 340. The address information may be extracted from the notification later and used to read the data cells from memory unit 340. First I/O unit 336 and second I/O unit 338 may send the notification to R unit 342. While first I/O unit 336 and second I/O unit 338 are shown as separate units, they may be implemented as a single unit in other embodiments consistent with the principles of the invention.

R unit 342 may receive notifications from first I/O unit 336 and second I/O unit 338. R unit 342 may provide route lookup, accounting, and policing functionality based on the notifications. R unit 342 may receive one or more forwarding tables from RE 130 (FIG. 1) and use the keys, forwarding table(s), and encapsulation tables to perform route or encapsulation lookups. R unit 342 may insert the lookup result into a notification, which it may store in memory unit 340.

Memory unit 340 may temporarily store data cells from first I/O unit 336 and second I/O unit 338 and notifications from R unit 342. Memory 340 may dispatch the notifications to first I/O unit 336 and second I/O unit 338. In response, first I/O unit 336 and second I/O unit 338 may use the address information in the notification to read out data cells from memory unit 340 that correspond to a notification. The notification received from memory unit 340 may have been modified by R unit 342 with route or encapsulation lookup results. First I/O unit 336 and second I/O unit 338 may update the data cells read out of memory unit 340 with information from the modified notification. The data cells, which now include information from the modified notification, are sent to processing unit 332, processing unit 334, or switch fabric 120, depending on which of first I/O unit 336 or second I/O unit 338 is processing the notification.

Exemplary Processing Unit Configuration

As described above, processing units 332 and 334 may operate in a first mode for processing packet data received from the PIC connected to it, and in a second mode for processing data cells received from first 110 device 336. Processing units 332–334 may operate in the first and second modes at the same time (i.e., the modes are not mutually exclusive). In the first mode, processing unit 332 or 334 may process packet header information from PIC 210 to convert the packets into data cells, and transmit the data cells to first I/O unit 336. In the second mode, processing unit 332 or 334 receives data cells from first I/O unit 336, extracts the notification, control information, and packet data from the data cells, and creates a packet, including a correct packet header, based on the extracted information.

Figure 4:
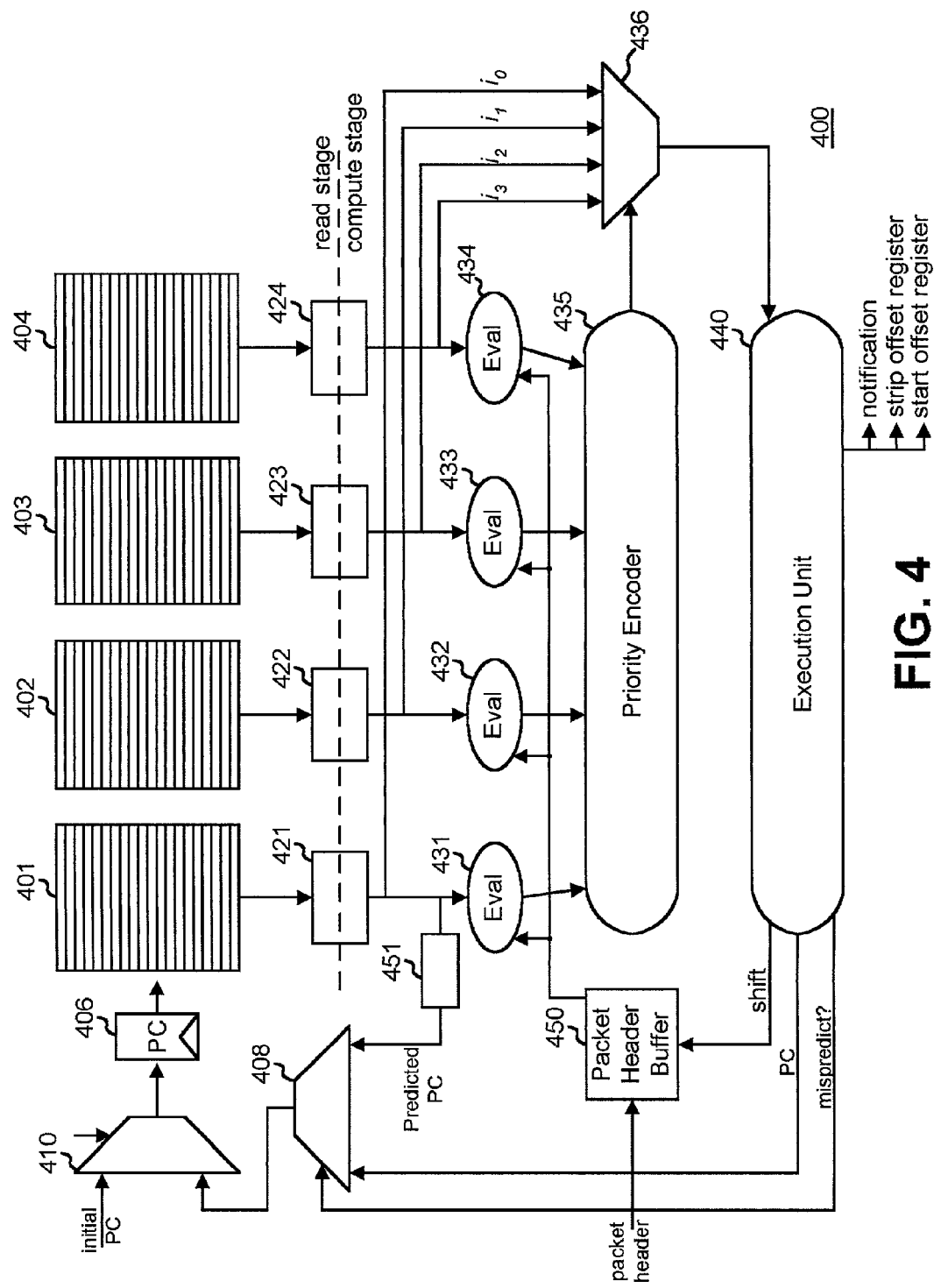
FIG. 4 is a block diagram of a pipelined processing engine consistent with principles of the invention for processing packet header information.

FIG. 4 is a block diagram of a pipelined processing engine 400 consistent with the principles of the invention for processing packet header information. The pipelined processor engine 400 may be implemented within processing unit 332 or 334 and operates on packet header information from PIC 210 (i.e., the first mode of processing unit 332 or 334).

Processing engine 400 is implemented as a two-stage pipeline, referred to as the read stage and the compute stage. The read stage includes microcode instruction memories 401–404, program counter (PC) 406, and multiplexers 408 and 410. Buffers 421–424 provide a timing interface between the read stage and the compute stage. Instructions are passed between the read stage and the compute stage via the buffers 421–424.

The compute stage begins with evaluation components 431–434, which evaluate a portion of the packet from packet header buffer 450 and an instruction from each of the respective instruction memories 401–404 to generate a true/false (logic one/logic zero) output value. Priority encoder 435 receives the logic outputs from evaluation components 431–434 and generates a control signal that instructs multiplexer 436 to forward one of the four microcode instructions, labeled as $i_0$–$i_3$, input to evaluation components 431–434, to execution unit 440. Based on the received instruction, execution unit 440 may, for example, update control information related to the packet, such as the notification information, and output a correct program counter value to multiplexer 408.

In general, execution unit 440 is a special purpose hardware execution unit performs a number of functions. In particular, two functions performed by execution unit 440 include (a) logical interface information lookup and (b) IP header checking. In (a), a physical interface may have more than one logical interface. Execution unit 440 may look up per logical interface information. As per (b), execution unit 440 may include specialized hardware to accelerate IP header checks. Other functions performed by execution unit 440 are described below.

Each instruction memory 401–404 may store a plurality of microcode instructions. Program counter register 406 stores the address of the presently active microcode instructions. For example, if program counter 406 stores the number 10, then the tenth instruction (i.e., the instruction in the tenth row) of instruction memories 401–404 are the active instructions that are read into buffers 421–424. At any particular pipeline cycle, four instructions are simultaneously read into buffers 421–424, one from each of microcode instruction memories 401–404. One of the instructions, such as instruction $i_0$, is also transmitted to branch prediction component 451, which generates a predicted next value for the program counter based on the assumption that instruction $i_0$ is the instruction that ends up being chosen by priority encoder 435.

Microcode instructions in buffers 421–424 are forwarded to evaluation components 431–434, respectively. As previously mentioned, each of the evaluation components evaluates a portion of the packet from packet header buffer 450 and its respective instruction to generate a logic one (true) or logic zero (false) value. Based on the generated logic signals, priority encoder 435 instructs multiplexer 436 to pass one of instructions $i_0$–$i_3$ to execution unit 440. If none of instructions $i_0$–$i_3$ evaluate to true, priority encoder 435 passes a "do-nothing" instruction that simply increments the program counter.

In one implementation, priority encoder 435 forwards instruction $i_0$ when the result of evaluation component 431 is true, otherwise, if the result of evaluation component 432 is true, priority encoder 435 instructs multiplexer 436 to forward instruction $i_1$. If the results of both evaluation components 431 and 432 are false, then priority encoder 435 forwards instruction $i_2$ if the result of evaluation component 433 is true, otherwise, the priority encoder forwards the result of evaluation component 434. In this manner, priority encoder 435 picks the first of instructions $i_0$–$i_3$ that evaluate to true (i.e., instructions $i_0$–$i_3$ are mutually exclusive of one another). Priority encoder 435 may also implement instruction selection using other selection algorithms.

Execution unit 440 receives the instruction passed through multiplexer 436. Based on the instruction, execution unit 440 may perform a variety of actions. In particular, execution unit 440 may generate portions of the control information for the active packet. As shown in FIG. 4, execution unit 440 may write the control information and write to registers related to the control information, such as a strip offset register and a start offset register.

Execution unit 440 may also generate control information that is fed back into the read and write compute stages. As shown, execution unit 440 generates a mispredict signal if the program counter value predicted by branch prediction component 451 is not accurate, a correct program counter value, and an indication to shift the active portion of the header in packet header buffer 450.

Figure 5:
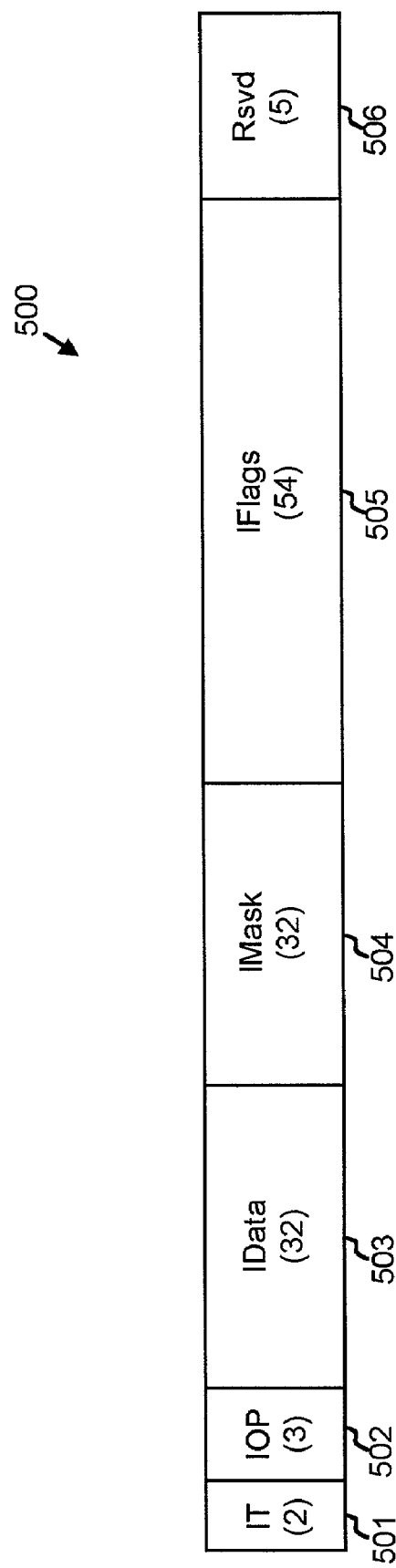
FIG. 5 is a diagram illustrating an exemplary format of a microcoded instruction.

FIG. 5 is a diagram illustrating an exemplary format of a microcode instruction 500 consistent with the principles of the invention. Instruction 500 may be a 128 bit instruction that is divided into a number of fields. The fields, illustrated in FIG. 5, can include a two-bit IT (instruction type) field 501, a three-bit IOP (type of operation) field 502, a 32-bit IData field 503, a 32-bit IMask field 504, a 54-bit IFlags field 505, and a five-bit Rsvd field 506. Table I, below, gives a descriptions of fields 501–505. Field 506 is a reserved field that may be used for future enhancements.

TABLE I

| Field | Width | Description |
|---|---|---|
| IT | 2 | This is instruction type field. The possible types of instructions are: IT = 00, invalid instruction. IT = 01, continue instruction. IT = 10, end instruction. IT = 11, reserved for future use. |
| IOP | 3 | This is the type of operation field. IOP = 000, is equal to operation. IOP = 001, less than operation. IOP = 010, greater than operation. IOP = 011, is not equal to operation. IOP = 100, extract instruction. IOP = 101, write instruction. IOP = 110, default instruction. IOP = 111, reserved for future use. |
| IDATA | 32 | If IOP indicates a logical operation, then IDATA is the data against which the compare operation is performed. Otherwise, this field specifies the details of the extract or write operation. |
| IMASK | 32 | If IOP indicates a logical operation, IMASK is used to mask the packet data. If IOP indicates a write operation, IMASK contains the value to which specified bits in the notification will be set. |
| IFLAGS | 54 | Indicates operations that are performed by the execution unit. See Table II, below. |

IT field 501 specifies the type of microinstruction. Examples of the possible types of instructions include an invalid instruction, a continue instruction, or an end of program instruction.

IOP field 502 specifies the type of operation that is to be performed. In general, examples of the possible types of operations can be divided into three instruction classes: (1) logical operations, (2) a default operation, and (3) the "extract" and "write" operations. The logical operations may include equal to, less than, greater than, and not equal to. Evaluation components 431–434 evaluate logical operations as:

((Input_Packet_Data & IMask_Field) OP IData_Field) & Qual_Register[QUAL_INDEX], where "Input_Packet_Data" refers to the active packet header data in packet header buffer 450, "&" refers to the logical AND operation, "IMask_Field" refers to the data in IMask field 504, "OP" refers to the logical operation referenced in IOP field 502 (i.e., equal to, less than, etc.), and "IData_Field" refers to the data in IData field 503. Qual_Register[QUAL_INDEX] refers to a value in a register, called the qualification register, that further qualifies the final result of the instruction evaluation. Even if an instruction would otherwise evaluate to true, the end result will be false if the relevant bit in the qualification register is false. Stated in other words, the evaluation component logically ANDs the input packet data with IMask field 504, and then compares this result to IData field 503 using the specified logical operation. This result is then qualified based on the bit of the qualification register referenced by QUAL_INDEX. QUAL_INDEX is part of the IFlags field 505 (see Table II below). If the logical operation evaluates to true, the evaluation component outputs a logic one, otherwise the evaluation component outputs a logic zero.

In the situation in which IOP field 502 specifies either a type (2) (i.e., default) or type (3) (i.e., extract or write) instruction, the evaluation component outputs a logic one.

Execution unit 440 implements the extract and the write operations, when indicated in IOP field 502, for instructions selected by multiplexer 436. The extract instruction is used to extract up to four bytes from the packet header and write them to the control information. The write instruction is used to write up to four bytes of data from the IMask field 503 to the notification.

In addition to the extract and write operation, execution unit 440 implements the operations indicated in IFlags field 505. Table II, below, gives a description of an exemplary set of operations that may be set by the IFlags field 505.

TABLE II

| Width | Field Name | Description |
|---|---|---|
| 7 | SHFT_B | The number of bytes to shift the active packet header data in packet header buffer 450. |
| 7 | JUMP_B | The number of instructions to jump in instruction memories 401–404. |
| 8 | STRIP_B | When set, indicates that certain bytes are to be stripped from the packet. The packets to be stripped are specified in the strip offset register. |
| 6 | SOF | When set, indicates an offset that is to be used in the packet's notification. The offset is stored in a state offset register. |
| 5 | QUAL_INDEX | Extracts an indicated bit from a 32 bit register. |
| 1 | SIL | Used to indicate the number of levels of lookup for a packet. Each time the bit is asserted during a program indicates an additional level of lookup. |
| 2 | IIF_B | The number of bytes to pick to compute the offset for a packet lookup. |
| 1 | PT_VLD | When asserted, the protocol type field of the packet is copied into the notification. |
| 3 | PT | Protocol type to be copied to the notification. |
| 1 | CHECK_IP | Defines whether the IPV4 or IPV6 header length should be checked. |
| 1 | IPV4_IPV6 | If true, packet is using an IPV4 header, if false, the packet is using an IPV6 header. |
| 1 | GEN_SKPOF | Implies that a skip offset should be generated. |
| 1 | GENCNT_EN | Implies that a generic counter for the packet stream should be incremented. |
| 2 | GENCNT_SEL | Used to specify which of four generic counters to increment. |

TABLE II-continued

| Width | Field Name | Description |
|---|---|---|
| 1 | TCP | When true, implies that a TCP bit in the notification should be set. |
| 1 | DF | When true, implies that a "don't fragment bit" in the notification should be set. |
| 1 | OP | When true, implies that a "set option bit" in the notification should be set. |
| 1 | DISCARD | When true, implies that the packet should be discarded. |
| 1 | TE | When true, implies that a "TTL error bit" in the notification should be set. |
| 1 | NMSTP | When true, implies that a "NMSTP bit" in the notification should be set. |
| 1 | SMP | When true, implies that a "sample bit" in the notification should be set. |
| 1 | IP_EOT | When true, implies that a "Lin_EOT" bit in the notification should be set. |

As shown in Table II, the various bits in IFlags field 505 cause execution unit 440 to implement a number of possible actions, including jumping to a particular address in instruction memories 401–404, shifting the data in packet header buffer 450, or setting various control bits in the control information associated with the packet header. One of ordinary skill in the art will recognize that the various operations set by IFlags field 505 (Table II) are exemplary. Additional or fewer operations could be used. Further, one of ordinary skill in the art will appreciate that description of the various operations in Table II are meant to provide a high level overview of the types of operations set in IFlags field 505, and are not detailed specifications for these operations.

Operation of Pipelined Processing Engine

Figure 6:
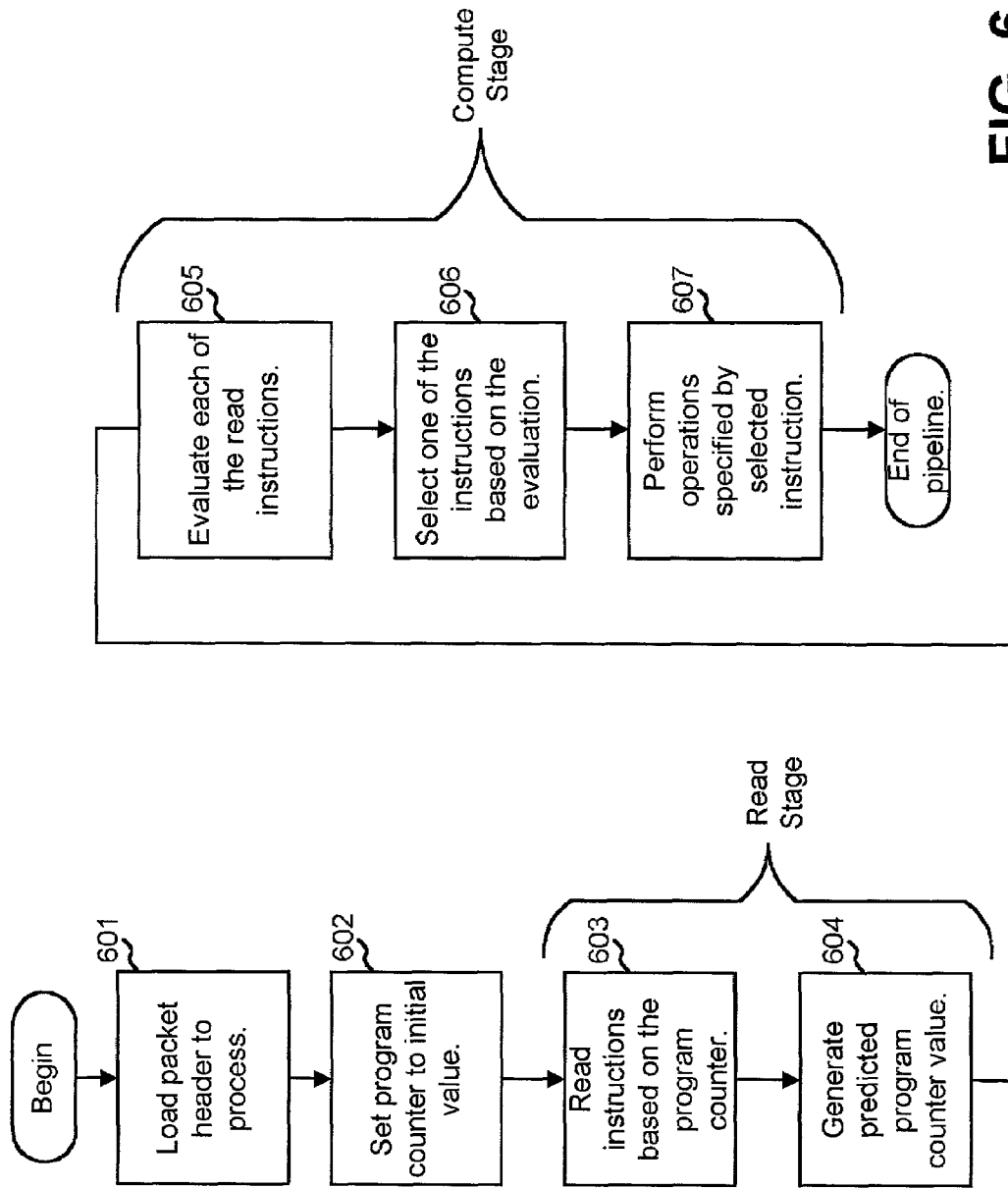
FIG. 6 is a flow chart illustrating the operation of the pipelined processing engine shown in FIG. 4.

The operation of pipelined processing engine 400 will now be described in additional detail with reference to FIG. 6.

For a particular packet header, processing begins by loading the packet header into packet header buffer 450 and setting program counter 406 to its initial value via multiplexer 410 (Acts 601 and 602). During the read stage of the pipeline, four instructions from instruction memories 401–404 are read into buffers 421–424 based on the current value of program counter 406 (Act 603). Additionally, a predicted next value of the program counter is generated by branch prediction component 451 based on instruction $i_0$ from instruction memory 401 (Act 604). If execution unit 440 does not generate a mispredict signal, the predicted value of the program counter will be used in the next cycle of the read stage.

Simultaneously while performing Acts 603 and 604 for the read stage, pipeline processing engine 400 also implements the compute stage. In the compute stage, evaluation components 431–434 generate a logic one or logic zero based on the portion of the packet received from packet header buffer 450 and on the operation specified in the IOP field 502 (Act 605). Based on the results of evaluation components 431–434, priority encoder 435 controls multiplexer 436 to forward the selected one of instructions $i_0$–$i_3$ to execution unit 440 (Act 606). Execution unit 440 performs the operations specified by the selected instructions in IOP field 502 and IFlags field 505 (Act 607). As shown in Tables I and II, these operations may include a write instruction, an extract instruction, a program counter jump instruction, a byte shift instruction, or a number of other instructions related to packet processing.

Additionally, execution unit 440 generates a "true" next program counter value. If the true program counter value is not the same as the previously predicted program counter value, execution unit 440 instructs multiplexer 408 to forward the true program counter value. In this situation, the pipeline suffers a bubble caused by the mispredicted program counter value. The cycle containing the bubble contains bad data and is discarded.

SUMMARY

As described above, a high performance pipelined processor is capable of analyzing packet header information. Flexibility in processing is achieved through the use of a microcoded instruction set designed to perform packet processing functions. The pipelined processor additionally includes a program counter jump prediction mechanism.

Although described in the context of operating on packet header data, concepts consistent with the principles of the invention may apply to pipelined processors operating on other forms of data.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts has been presented with respect to FIG. 6, the order of the acts may be different in other implementations consistent with principles of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A pipelined processor comprising:
   a first pipeline stage including:
      a plurality of instruction memories, and
      a program counter corresponding to a location in each of the instruction memories from which instructions are read; and
   a second pipeline stage including:
      an evaluation component corresponding to each of the instruction memories, the evaluation components generating evaluation results based on each of the instructions read from the instruction memories,
      a priority encoder configured to select one of the instructions based on the evaluation results generated from the instructions read from the instruction memories, and discard instructions not selected by the priority encoder, and
      an execution unit configured to receive the selected one of the instructions and to perform operations indicated by the selected instruction.

2. The pipelined processor of claim 1, wherein the execution unit performs packet processing operations.

3. The pipelined processor of claim 1, further comprising:
   a packet header buffer connected to the priority encoder and the execution unit.

4. The pipelined processor of claim 1, wherein the instructions are read from a memory address equal to the value of the program counter.

5. The pipelined processor of claim 1, wherein the evaluation components generate the evaluation results based on a logical operation dictated by the instructions.

6. The pipelined processor of claim 1, further comprising:
a branch prediction component configured to generate a predicted program counter value based on instructions read from one of the instruction memories, wherein
the execution unit generates a true program counter value based on the selected instruction and generates an indication of whether the predicted program counter value is accurate.

7. The pipelined processor of claim 1, wherein the second pipeline stage further comprises:
a multiplexer configured to receive the read instructions and to forward the selected one of the instructions to the execution unit based on a signal from the priority encoder.

8. The pipelined processor of claim 1, further comprising:
a plurality of memory elements implemented as an interface between the first and second pipeline stages.

9. A network device comprising:
a physical interface configured to receive packets from and transmit packets to a network; and
a processing unit configured to store the received packets and to examine header information of the packets, the processing unit including a pipelined packet processing engine that comprises:
a first pipeline stage configured to read a plurality of packet processing instructions relating to processing of a first packet from instruction memories per processing cycle, and
a second pipeline stage configured to select one of the packet processing instructions for execution and discard the non-selected ones of the plurality of packet processing instructions.

10. The network device of claim 9, wherein the network device is a router.

11. The network device of claim 9, wherein the first pipeline stage comprises:
a program counter configured to store a program address value used to read the packet processing instructions from the instruction memories.

12. The network device of claim 9, wherein the second pipeline stage comprises:
a priority encoder configured to select the one of the packet processing instructions based on evaluation results generated from the packet processing instructions read from the instruction memories, and
an execution unit configured to receive the selected one of the packet processing instructions and to perform operations indicated by the selected packet processing instruction.

13. The network device of claim 11, wherein the plurality of instructions read from the instruction memories are read from a memory address equal to the value of the program counter.

14. The network device of claim 12, wherein the second pipeline stage further comprises:
an evaluation component corresponding to each of the instruction memories, the evaluation components generating the evaluation results based on each of the instructions read from the instruction memories.

15. The network device of claim 14, further comprising:
a packet header buffer connected to the evaluation component.

16. The network device of claim 14, wherein the evaluation components generate the evaluation results based on a logical operation dictated by the packet processing instructions.

17. The network device of claim 9, further comprising:
a branch prediction component configured to generate a predicted program counter value based on packet processing instructions read from one of the instruction memories, wherein
an execution unit generates a true program counter value based on the selected packet processing instruction and generates an indication of whether the predicted program counter value is accurate.

18. The network device of claim 12, wherein the second pipeline stage further comprises:
a multiplexer configured to receive the read packet processing instructions and to forward the selected one of the packet processing instructions to an execution unit based on a signal from the priority encoder.

19. The network device of claim 9, further comprising:
a plurality of timing buffers implemented as an interface between the first and second pipeline stages.

20. A method for processing a packet to determine control information for the packet, the method comprising:
reading a plurality of instructions;
generating a predicted address based on a predetermined one of the read instructions;
evaluating the read instructions by applying operations specified in the read instructions to at least a portion of the packet;
selecting one of the read instructions based on the evaluations; and
performing operations related to determining the control information for the packet based on the selected instruction, the operations including generating a next address for reading instructions.

21. The method of claim 20, wherein evaluating the read instructions is performed based on a field in the instructions that specifies a logical operation that is to be performed.

22. The method of claim 20, wherein the method is performed in two pipelined stages.

23. The method of claim 20, wherein the selecting of one of the read instructions is performed as a priority selection from among ones of the read instructions that evaluate to a logic true value.

24. The method of claim 20, wherein the operations include an extract instruction that is used to extract designated information from the packet into a memory.

25. The method of claim 20, wherein the operation includes a write instruction used to write information contained in a field of the write instruction to a memory.

26. A pipelined processing device comprising:
means for simultaneously reading a plurality of processing instructions from instruction memory that relate to processing a packet; and
means for selecting one of the read instructions for execution based on a priority encoding of evaluation results related to each of the read instructions, and discarding non-selected ones of the read instructions.

27. The pipelined processing device of claim 26, wherein the means for reading and the means for selecting are implemented as first and second stages of the pipelined processing device, respectively.

28. The pipelined processing device of claim 26, further comprising:
means for storing a value that designates an address to the instruction memory.

29. The pipelined processing device of claim 28, further comprising:

means for generating a predicted next value to store in the means for storing; and means for generating a true next value to store in the means for storing.

\* \* \* \* \*